(12) United States Patent
Yamazaki

(10) Patent No.: US 7,420,896 B2
(45) Date of Patent: Sep. 2, 2008

(54) INFORMATION RECORDING APPARATUS

(75) Inventor: Mitsuo Yamazaki, Hachioji (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 591 days.

(21) Appl. No.: 10/786,617

(22) Filed: Feb. 26, 2004

(65) Prior Publication Data

US 2004/0179440 A1 Sep. 16, 2004

(30) Foreign Application Priority Data

Feb. 28, 2003 (JP) ............................. 2003-053815

(51) Int. Cl.
*G11B 7/00* (2006.01)
(52) U.S. Cl. .............. 369/44.32; 369/53.19; 369/53.14; 369/53.2; 369/44.26
(58) Field of Classification Search .............. 369/53.19, 369/44.32, 53.13, 53.15, 47.14, 53.2, 53.14, 369/44.26
See application file for complete search history.

(56) References Cited

U.S. PATENT DOCUMENTS

| 4,866,688 | A * | 9/1989 | Ohtake et al. ............. 369/44.13 |
| 6,204,660 | B1 * | 3/2001 | Lee ............................. 324/212 |
| 6,292,317 | B1 * | 9/2001 | Alexander .................... 360/31 |
| 6,493,301 | B1 * | 12/2002 | Park ........................ 369/53.15 |
| 6,538,692 | B2 * | 3/2003 | Niwa ........................ 348/231.1 |
| 6,545,958 | B1 * | 4/2003 | Hirai et al. ............... 369/44.32 |
| 6,704,153 | B1 * | 3/2004 | Rothberg et al. .............. 360/31 |
| 2001/0046195 | A1 * | 11/2001 | Togashi .................... 369/53.19 |

FOREIGN PATENT DOCUMENTS

| CN | 1192555 | 9/1998 |
| CN | 1202700 | 12/1998 |
| JP | 03-292647 | 12/1991 |
| JP | 2000-293850 | * 10/2000 ........................ 7/4 |
| JP | 2001-056936 | 2/2001 |
| JP | 2001-256649 | 9/2001 |
| JP | 2002-222586 A | 8/2002 |

OTHER PUBLICATIONS

Japanese Office Action dated Dec. 13, 2005 for Appln. No. 2003-053815.

* cited by examiner

*Primary Examiner*—Thang V. Tran
*Assistant Examiner*—Thomas D Alunkal
(74) *Attorney, Agent, or Firm*—Pillsbury Winthrop Shaw Pittman, LLP

(57) ABSTRACT

An information recording apparatus according to one aspect of this invention comprises a detection unit configured to detect a manufacturing error unique to an information storage medium, a transmission unit configured to transmit the manufacturing error detected by the detection unit to an external apparatus, a reception unit configured to receive a recordable capacity which is calculated by the external apparatus on the basis of the manufacturing error transmitted from the transmission unit, a limitation unit configured to limit data to be supplied on the basis of the recordable capacity received by the reception unit, and a recording/aborting unit configured to record the recording data, supply of which is limited by the limitation unit, or to abort recording of the recording data.

10 Claims, 5 Drawing Sheets

INFORMATION RECORDING APPARATUS

CROSS-REFERENCE TO RELATED APPLICATIONS

This application is based upon and claims the benefit of priority from the prior Japanese Patent Application No. 2003-53815, filed Feb. 28, 2003, the entire contents of which are incorporated herein by reference.

BACKGROUND OF THE INVENTION

1. Field of the Invention

The present invention relates to an information recording apparatus for recording data on an information storage medium such as an optical disc.

2. Description of the Related Art

As recordable information storage media, discs such as DVD-R, DVD-RW, DVD-RAM, are available. The standards for these discs specify maximum recordable capacities. Disc drives handle such discs under the assumption that all these discs are manufactured to clear the specifications specified by the standards. For example, Jpn. Pat. Appln. KOKAI Publication No. 2002-222586 discloses a technique for recording data on a recordable area on a disc under the condition that a disc drive can actually record data up to a maximum recordable capacity specified by the standards.

However, discs on the market include inferior ones which are manufactured to specifications below the standards. When a recording capacity is set under the assumption that the full recordable area of such inferior disc can undergo recording and reproduction, and data is recorded, data cannot be recorded in practice in a portion with the specifications below the standards. Even when data can be recorded, that data cannot often be reproduced. As a result, wrong information indicating that recording/reproduction was done is often provided to the user who uses the disc drive, although recording/reproduction cannot be done in practice. Also, when the user quits operation believing that data was recorded, data may not be reproduced, and the user may consequently lose data.

BRIEF SUMMARY OF THE INVENTION

An information recording apparatus according to one aspect of the present invention comprises a detection unit configured to detect a manufacturing error unique to an information storage medium, a transmission unit configured to transmit the manufacturing error detected by the detection unit to an external apparatus, a reception unit configured to receive a recordable capacity which is calculated by the external apparatus on the basis of the manufacturing error transmitted from the transmission unit, a limitation unit configured to limit data to be supplied on the basis of the recordable capacity received by the reception unit, and a recording/aborting unit configured to record the recording data, supply of which is limited by the limitation unit, or to abort recording of the recording data.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below serve to explain the principles of the invention.

DETAILED DESCRIPTION OF THE INVENTION

Preferred embodiments of the present invention will be described hereinafter with reference to the accompanying drawings.

Figure 1:
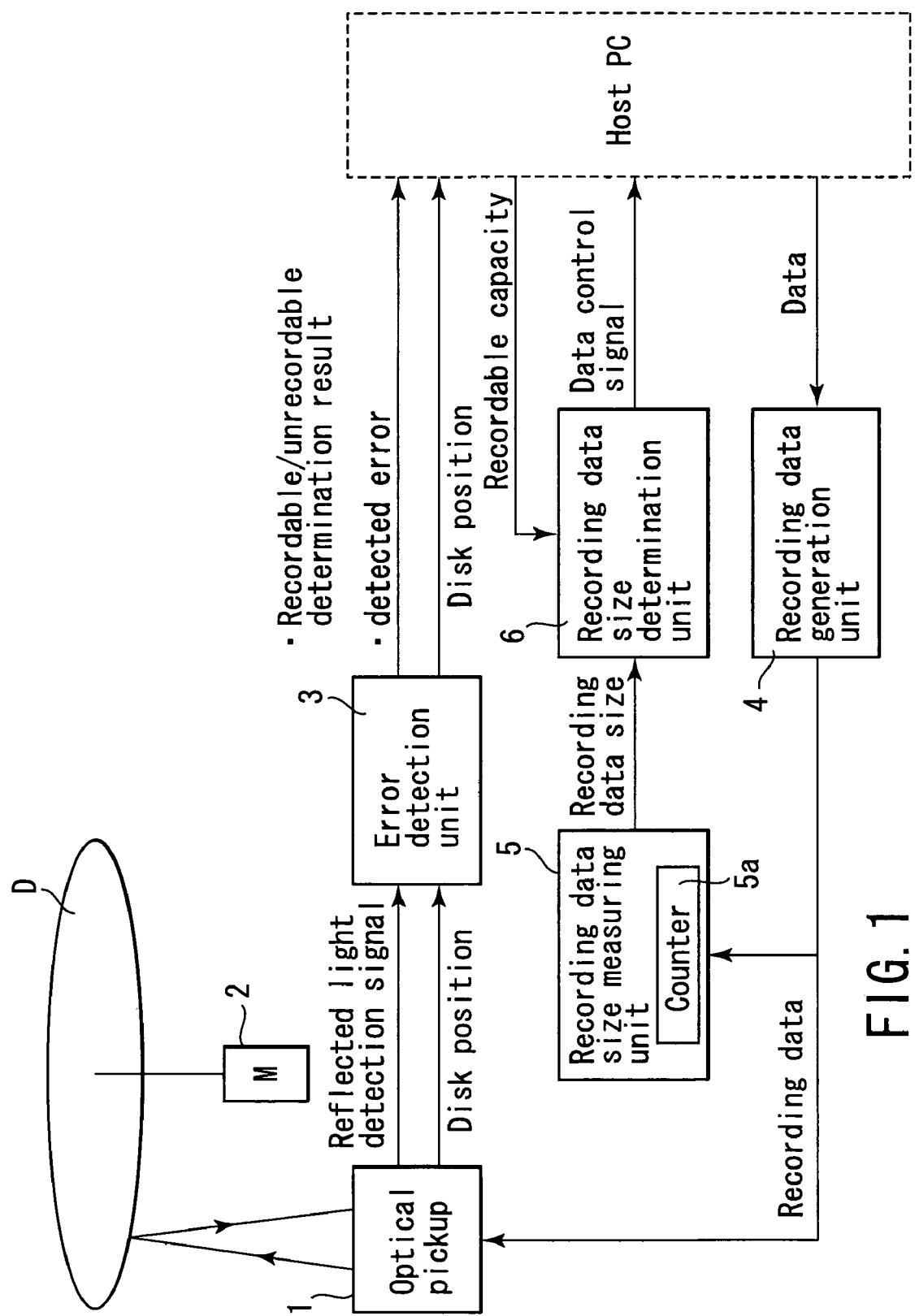
FIG. 1 is a schematic block diagram showing the arrangement of a disc drive (information recording apparatus) according to the first embodiment of the present invention.

FIG. 1 is a schematic block diagram showing the arrangement of a disc drive (information recording apparatus) according to the first embodiment of the present invention. As shown in FIG. 1, the disc drive comprises an optical pickup 1, spindle motor 2, error detection unit 3, recording data generation unit 4, recording data size measuring unit 5, and recording data size determination unit 6.

An information recording process of this disc drive on a disc D will be described first. The disc D is rotated by the spindle motor 2. Upon reception of a recording instruction from a host computer (host PC), the optical pickup 1 is driven to appropriately focus a laser beam at a target recording position. The recording data generation unit 4 generates recording data by modulating data (data symbols) provided from the host PC to data of a channel bit sequence in accordance with a predetermined modulation scheme, and appending an ECC (Error Correction Code) and the like to the modulated data. The data of the channel bit sequence corresponding to the recording data is converted into a laser drive waveform, which is supplied to a laser output unit mounted on the optical pickup 1. The laser output unit emits a recording laser beam in accordance with the laser drive waveform. The recording laser beam emitted by the laser output unit is converted into collimated light by a collimator lens, and enters and passes through a polarization beam splitter. The beam that has passed through the polarization beam splitter is transmitted through a quarter wave plate, and is focused on an information recording surface of the disc D by an objective lens. The focused recording laser beam is maintained to form a best small spot on the recording surface under the focusing/tracking control.

A data reproduction process from the disc D by this disc drive will be described below. The disc D is rotated by the spindle motor 2. Upon reception of a reproduction instruction from the host computer, the optical pickup 1 is driven to appropriately focus a laser beam at a target reproduction position, and the laser output unit emits a reproduction laser beam. The reproduction laser beam emitted by the laser output unit is converted into collimated light by the collimator lens, and enters and passes through the polarization beam splitter. The beam that has passed through the polarization beam splitter is transmitted through the quarter wave plate, and is focused on the information recording surface of the disc D by the objective lens. The focused reproduction laser beam is maintained to form a best small spot on the recording surface under the focusing/tracking control. At this time, the reproduction laser beam that strikes the recording surface is reflected by a reflection film or reflective recording film in the information recording surface of the disc. The reflected light is transmitted through the objective lens in the reverse direction to be converted into collimated light again. The reflected light is transmitted through the quarter wave plate, and is reflected by the polarization beam splitter since it has a plane of polarization perpendicular to the incoming light. The beam reflected by the polarization beam splitter is converted into convergent light by a focusing lens, and enters a photodetector. The photodetector comprises, e.g., a 4-split photodetector. The light beam that has entered the photodetector is photoelectrically converted into an electrical signal, which is amplified. The amplified signal is equalized and binarized, and reproduction data is generated by demodulation corresponding to the predetermined modulation scheme.

Figure 2:
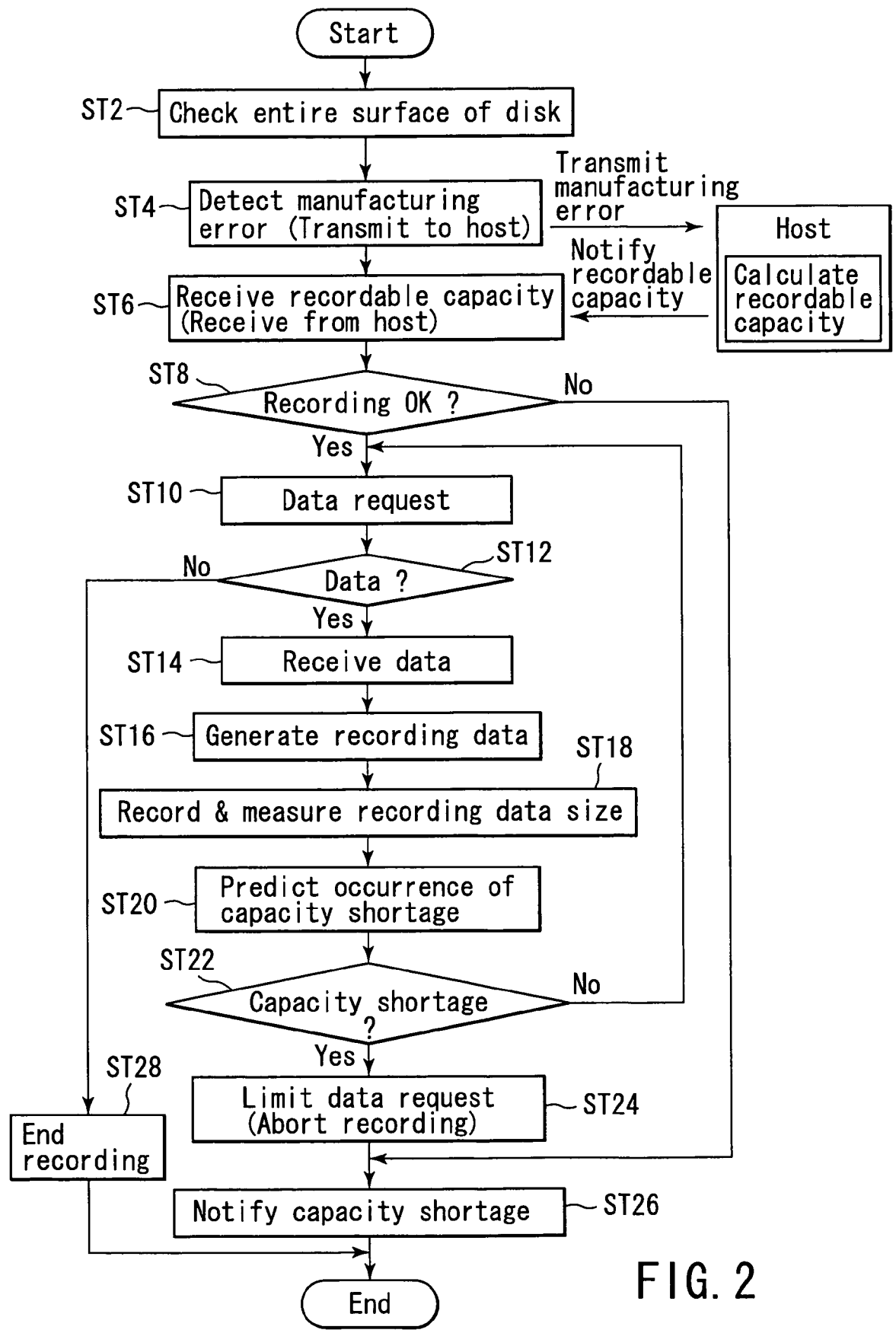
FIG. 2 is a flow chart showing a data recording process by the disc drive according to the first embodiment of the present invention.

The data recording process by the disc drive shown in FIG. 1 will be described below with reference to the flow chart shown in FIG. 2.

The disc drive checks the entire surface of the disc D at a predetermined timing (upon insertion of the disc D or upon reception of a recording instruction from the host computer) (ST2). For example, the optical pickup 1 irradiates the entire surface of the disc D with a light beam, and detects light reflected by the entire surface of the disc D. The photodetector (4-split photodetector) of the optical pickup 1 outputs four reflected light detection signals in correspondence with that reflected light. The error detection unit 3 generates a focusing error signal, tracking error signal, and disc reproduction signal on the basis of the four reflected light detection signals output from the photodetector of the optical pickup 1, and detects any manufacturing error unique to an information storage medium on the basis of these signals (ST4).

For example, the error detection unit 3 detects tilt amounts in respective areas on the disc. The error detection unit 3 detects the read rates of prepits recorded in the respective areas on the disc. The error detection unit 3 detects the disc eccentricity amounts in the respective areas on the disc. The error detection unit 3 detects the read rates of wobble signals obtained in correspondence with wobbled tracks formed on the disc or the jitter components of the wobble signals. The prepits are, for example, address data recorded at given intervals on the disc. That is, the read rate of the prepits indicates the accuracy of reading of the address data reflected on the prepits. The wobbled tracks are tracks which are formed on the disc, and are wobbled at periods that reflect the address data. That is, the read rate of the wobble signals indicates the accuracy of reading of the address data reflected on the wobbled tracks. Or the wobbled tracks are tracks which are formed on the disc and are wobbled at a given frequency. That is, the jitter components of the wobble signals indicate the quality of the wobble signals.

The error detection unit 3 determines, based on errors detected from the respective areas on the disc, whether or not data can be actually recorded on/reproduced from the respective areas. The error detection unit 3 transmits the recordable/unrecordable determination results and detected errors to the host computer. The host computer calculates a recordable capacity on the basis of the recordable/unrecordable determination results and detected errors. That is, the host computer calculates the recordable capacity on the basis of the tilt amounts, the read rates of the prepits, the disc eccentricity amounts, the read rates of the wobble signals, and the jitter components of the wobble signals. For example, when the tilt amount on the outer periphery side of the disc is large, the host computer inhibits data recording on a recordable area on the outer periphery side of the disc. Also, the host computer inhibits data recording on an area with poor read rate of the prepits. When a disc eccentricity amount is large, the host computer inhibits data recording on a recordable area on the outer periphery side of the disc. Also, the host computer inhibits data recording on an area with poor read rate or jitter components of the wobble signals. As a result of these inhibitions, an actual recordable capacity becomes smaller than the maximum recordable capacity specified by the standards. The host computer informs the disc drive (recording data size determination unit 6) of the calculated recordable capacity. The recording data size determination unit 6 receives the recordable capacity from the host computer (ST6), and determines whether or not data can be recorded (ST8).

For example, if the recordable capacity is equal to or smaller than a predetermined capacity, the recording data size determination unit 6 determines that data cannot be recorded (ST8, NO), and outputs a message indicating capacity shortage (ST26). This message may be received by the host computer and may be displayed on the screen of the host computer, or may be displayed on the disc drive. If the recordable capacity is larger than the predetermined capacity, the unit 6 determines that data can be recorded (ST8, YES), and requests the host computer to send data to be recorded (ST10). If data is transmitted from the host computer in response to this request (ST12, YES), the recording data generation unit 4 receives this data (ST14).

The recording data generation unit 4 executes a modulation process by appending an ECC to the received data, thus generating recording data (ST16). Data of a channel bit sequence corresponding to the generated recording data is converted into a laser drive waveform, which is supplied to the laser output unit mounted on the optical pickup 1, and is recorded on the disc (ST18). At the same time, the recording data is supplied to the recording data size measuring unit 5. The recording data size measuring unit 5 comprises a counter 5a, which counts the recording data and measures the data size of the recording data (ST18). The recording data size determination unit 6 is notified of the measured recording data size. The recording data size determination unit 6 compares the recordable capacity transmitted from the host computer and the recording data size notified by the recording data measuring unit 5, and predicts occurrence of capacity shortage in advance (ST20).

At this time, if occurrence of capacity shortage is not predicted (ST22, NO), the recording data size determination unit 6 continuously requests the host computer to send data to be recorded (ST10). If data is transmitted from the host computer in response to this request (ST12, YES), the recording data generation unit 4 receives this data (ST14), generates recording data (ST16), and successively records the recording data (ST18). If no data is transmitted from the host computer in response to the request (ST12, NO), that is, if recording of all data to be recorded is complete, the recording process normally terminates (ST28).

If occurrence of capacity shortage is predicted (ST22, YES), the recording data size determination unit 6 limits a request of data to be recorded transmitted from the host computer as needed (ST24). That is, the recording data size determination unit 6 transmits a data limit signal to the host computer at a predetermined timing to stop data transfer from the host computer, thus aborting the recording process. For example, the unit 6 may notify the host computer of stop of data supply simultaneously when occurrence of capacity shortage is predicted or after reception of data for a predetermined unit (e.g., ECC block unit) is complete. After the unit 6 notifies the host computer of stop of data supply, it outputs a message indicating capacity shortage (ST26). This message may be received by the host computer and may be displayed on the screen of the host computer, or may be displayed on the disc drive.

As described above, according to the present invention, since data is recorded on an actually recordable area on the basis of an actual recordable capacity, user data can be prevented from being lost. Also, the actual recordable capacity calculated by the host computer may be presented to the user. As a result, the user can recognize the actual recordable capacity.

Figure 3:
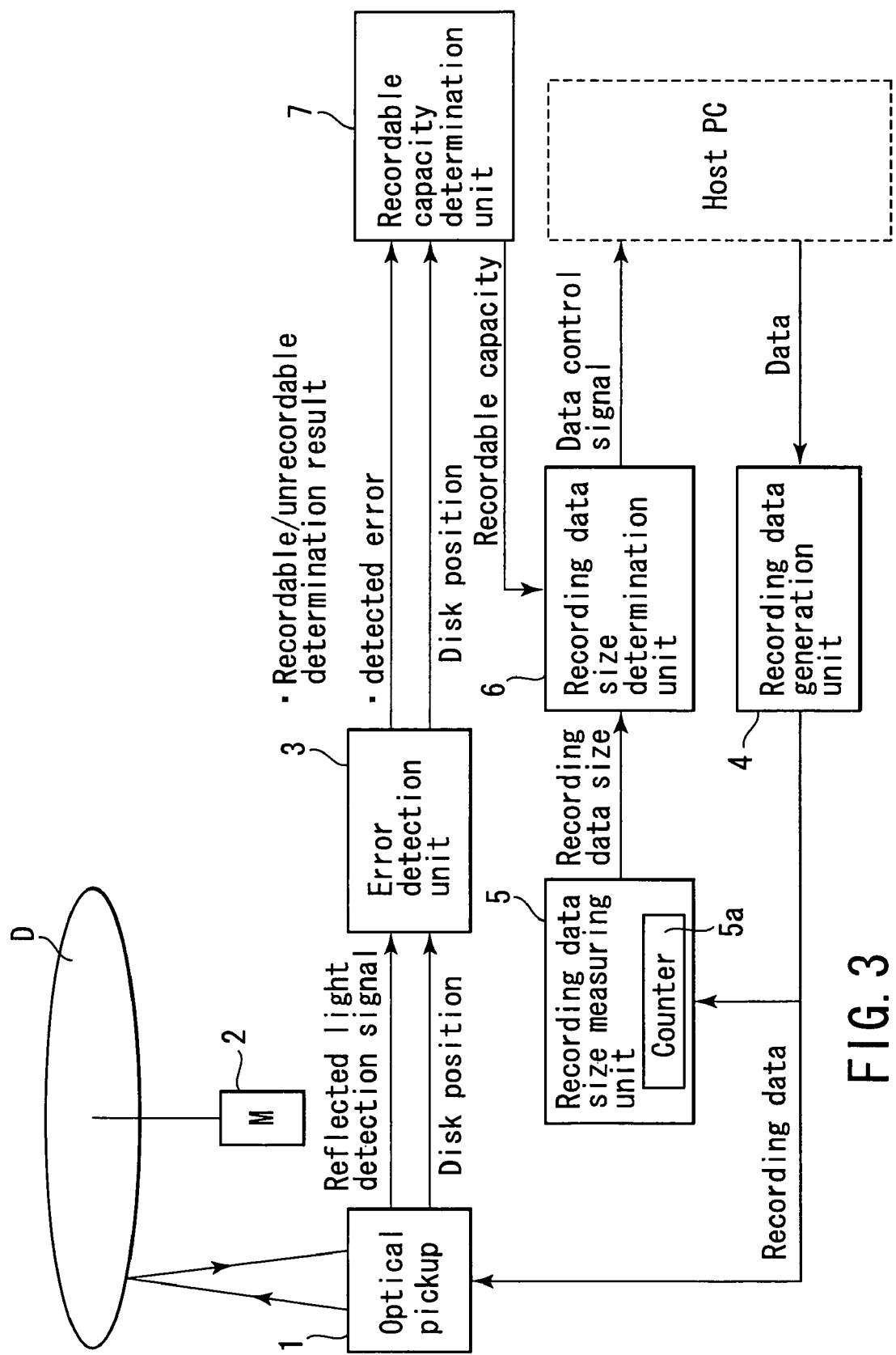
FIG. 3 is a schematic block diagram showing the arrangement of a disc drive (information recording apparatus) according to the second embodiment of the present invention.

FIG. 3 is a schematic block diagram showing the arrangement of a disc drive (information recording apparatus) according to the second embodiment of the present invention. As shown in FIG. 3, the disc drive comprises an optical pickup 1, spindle motor 2, error detection unit 3, recording data generation unit 4, recording data size measuring unit 5, recording data size determination unit 6, and recordable capacity determination unit 7. The information recording and reproduction processes on and from the disc D by the disc drive shown in FIG. 3 are the same as those of the disc drive shown in FIG. 1, and a detailed description thereof will be omitted. Also, the error detection process by the error detection unit 3, the recording data generation process by the recording data generation unit 4, the recording data size measuring process by the recording data size measuring unit 5, and the recording data size determination process by the recording data size determination unit 6 in the disc drive shown in FIG. 3 are the same as those in the disc drive shown in FIG. 1, and a detailed description thereof will be omitted. The biggest difference between the disc drives shown in FIGS. 1 and 3 is that the disc drive shown in FIG. 3 determines a recordable capacity using the recordable capacity determination unit 7 (see ST5 in the flow chart shown in FIG. 4).

Figure 4:
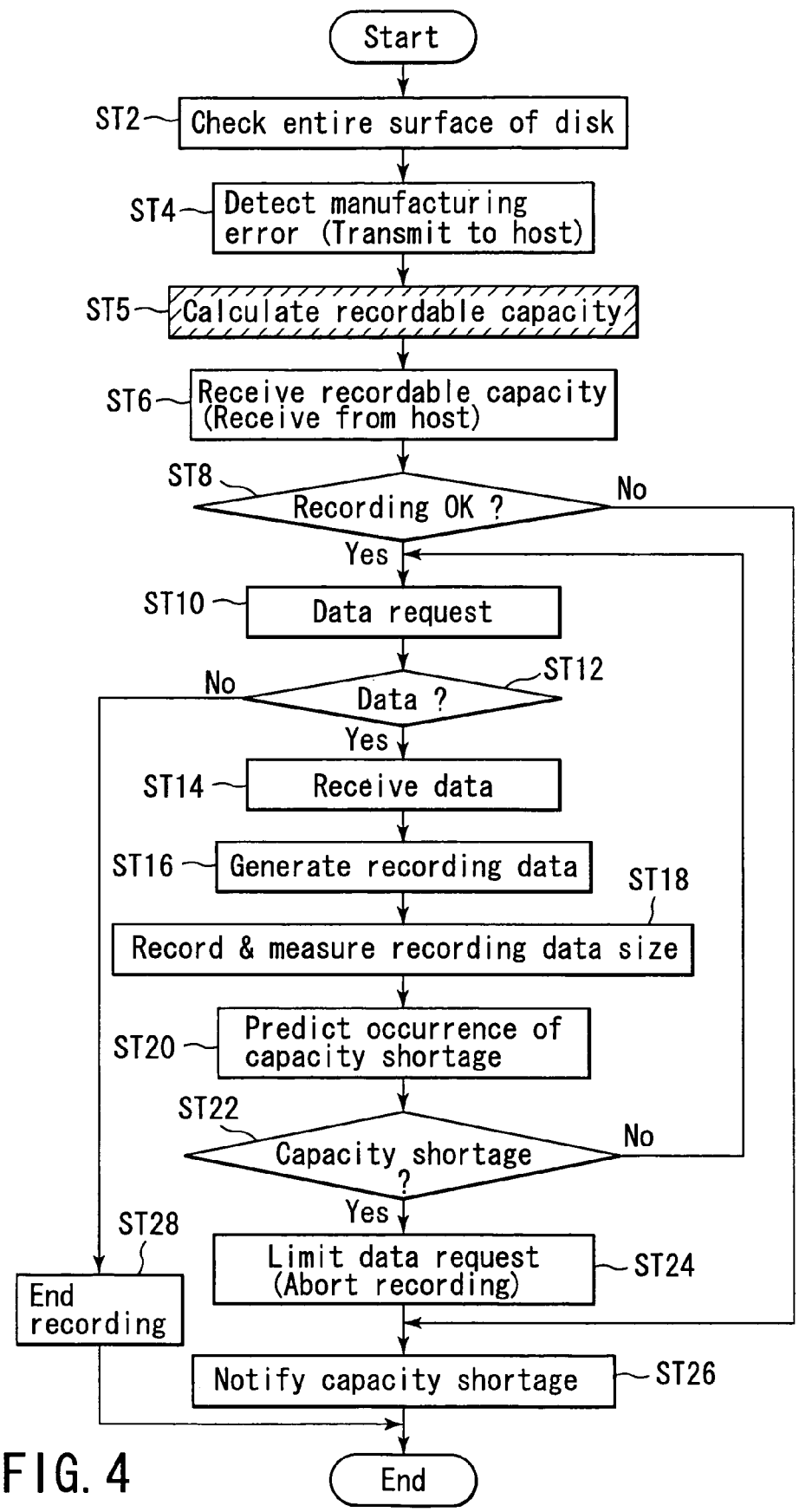
FIG. 4 is a flow chart showing a data recording process by the disc drive according to the second embodiment of the present invention.

That is, as shown in the flow chart of FIG. 4, the recordable capacity determination unit 7 calculates a recordable capacity on the basis of the recordable/unrecordable determination results and detected errors transmitted from the error detection unit 3 (ST5). More specifically, the recordable capacity determination unit 7 calculates a recordable capacity on the basis of the tilt amounts, the read rates of the prepits, the disc eccentricity amounts, the read rates of the wobble signals, and the jitter components of the wobble signals. The recordable capacity determination unit 7 notifies the recording data size determination unit 6 of the calculated recordable capacity. The recording data size determination unit 6 receives the recordable capacity from the host computer (ST6), and determines whether or not data can be recorded (ST8). The processes in the flow chart shown in FIG. 4 are substantially the same as those (ST1 to ST28) in the flow chart shown in FIG. 2, except for ST5, and a detailed description thereof will be omitted.

As described above, according to the present invention, since data is recorded on an actually recordable area on the basis of an actual recordable capacity, user data can be prevented from being lost. Also, the actual recordable capacity calculated by the recordable capacity determination unit 7 may be presented to the user. As a result, the user can recognize the actual recordable capacity.

Figure 5:
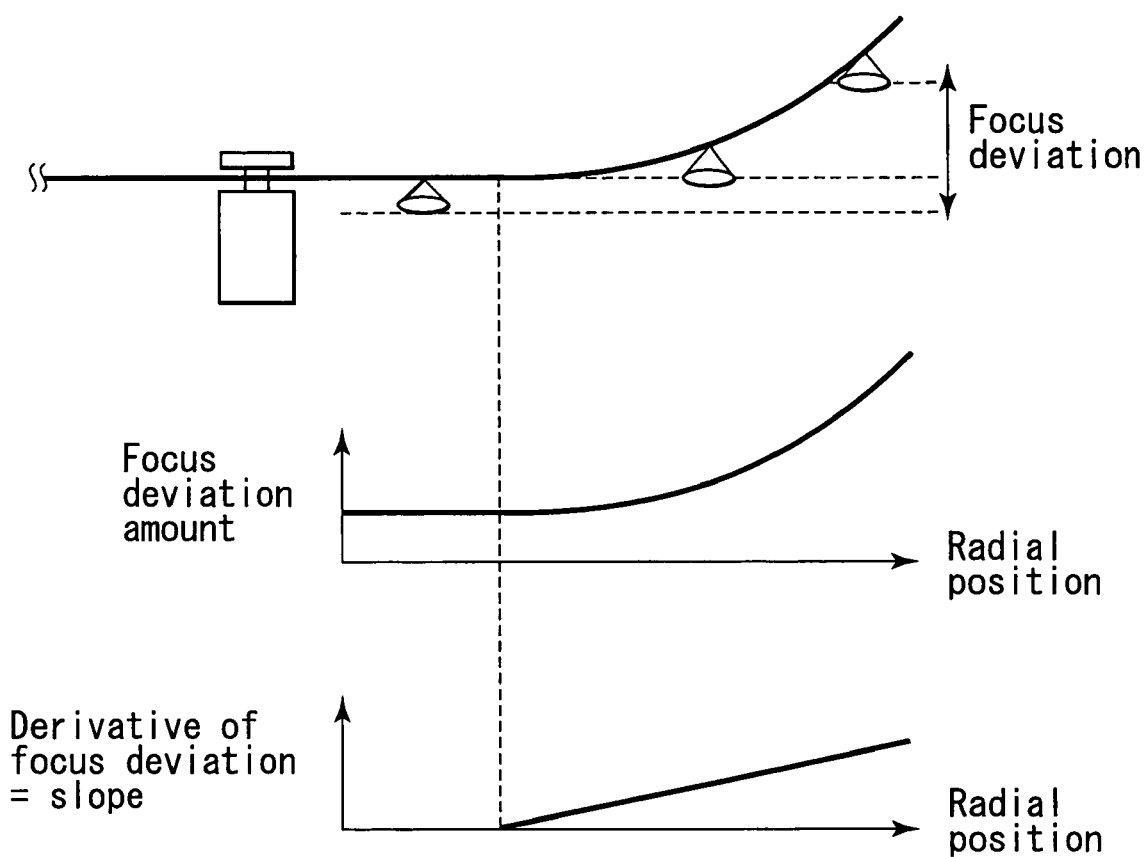
FIG. 5 is a view for explaining details of tilt amount detection.

Details of tilt amount detection will be explained below with reference to FIG. 5. As shown in FIG. 5, when a disc suffers a warp, a focusing error signal is generated in correspondence with the degree of warp. A focusing control signal is generated based on this focusing error signal. An actuator is driven based on the focusing control signal to just focus a light beam on the recording surface of the disc. That is, a bias component is generated in the focusing control signal in correspondence with the degree of warp of the disc.

The middle graph of FIG. 5 shows the relationship between this bias component (focus deviation) and the radial position, and the lower graph of FIG. 5 shows the relationship between the derivative of the focus deviation and the radial position. As can be seen from these graphs, the derivative of the focus deviation is proportional to the tilt amount of the disc. Therefore, by measuring the slope of this focus deviation, the tilt amount of the disc can be detected.

When more accurate tilt amount detection of the disc is required, the tilt amount of the optical axis with respect to a region between two points is detected. As a result, the influences of signal noise contained in the bias component and measurement variations can be greatly relaxed, thus allowing more accurate tilt amount detection of the disc.

Upon detecting the tilt amount of the disc, the disc drive controls a light beam to trace a plurality of positions with different radial distances on the disc, and samples focusing error signals from the plurality of positions. A plurality of focusing control signals are generated on the basis of the plurality of focusing error signals sampled from these positions. A plurality of DC bias components are detected based on these focusing control signals. The error detection unit 3 samples these detected DC bias components, and detects the tilt amount of the optical axis with respect to a given region on the basis of the difference between the two DC bias components. That is, the error detection unit 3 detects tilt amounts of the optical axis with respect to a plurality of regions with different radial distances on the disc on the basis of a plurality of bias components sampled from a plurality of positions with different radial distances on the disc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information recording apparatus comprising:
a detection unit configured to detect a manufacturing error unique to an information storage medium;
a transmission unit configured to transmit the manufacturing error detected by the detection unit to an external apparatus;
a reception unit configured to receive data indicating a recording capacity of the information storage medium which is calculated by the external apparatus on the basis of the manufacturing error transmitted from the transmission unit; and
a recording control unit configured to determine whether first recording target data is recordable based on the data received by the reception unit, to request the first recording target data of the external apparatus based on a result of the determination, to record, on the information storage medium, first recording data generated from the first recording target data, to compare an amount of the first recording data with the recording capacity, to request second recording target data of the external apparatus when lack of recording capacity is not estimated from a result of the comparison, to record, on the information storage medium, second recording data generated from the second recording target data, and to limit a request for the second recording target data when the lack of recording capacity is estimated from the result of the comparison, wherein the detection unit controls a light beam to trace a plurality of regions with different radial distances on the information storage medium, samples focusing error signals from the plurality of regions, generates a plurality of focusing control signals based on the plurality of focusing error signals, detects a plurality of DC bias components based on the focusing control signals, and detects a disc tilt amount of an optical axis with respect to each of the plurality of regions based on the difference between the DC bias components, the transmission unit transmits the disc tilt amount detected by the detection unit to the external apparatus, and the reception unit receives the recordable capacity which is calculated by the external apparatus on the basis of the disc tilt amount.

2. An apparatus according to claim 1, wherein the detection unit detects a read rate of prepits recorded on the information storage medium, the transmission unit transmits the read rate of the prepits detected by the detection unit to the external apparatus, and the reception unit receives the data indicating the recording capacity of the information storage medium which is calculated by the external apparatus on the basis of the read rate of the prepits.

3. An apparatus according to claim 1, wherein the detection unit detects a disc eccentricity amount unique to the information storage medium, the transmission unit transmits the disc eccentricity amount detected by the detection unit to the external apparatus, and the reception unit receives the data indicating the recording capacity of the information storage medium which is calculated by the external apparatus on the basis of the disc eccentricity amount.

4. An apparatus according to claim 1, wherein the detection unit detects a read rate of wobble signals obtained in correspondence with wobbled tracks formed on the information storage medium, the transmission unit transmits the read rate of the wobble signals detected by the detection unit to the external apparatus, and the reception unit receives the data indicating the recording capacity of the information storage medium which is calculated by the external apparatus on the basis of the read rate of the wobble signals.

5. An information recording apparatus comprising:

a detection unit configured to detect a manufacturing error unique to an information storage medium;

a determination unit configured to determine a recording capacity of the information storage medium on the basis of the manufacturing error detected by the detection unit; and a recording control unit configured to determine whether first recording target data is recordable based on the determined recording capacity, to request the first recording target data of an external apparatus based on a result of the determination, to record, on the information storage medium, first recording data generated from the first recording target data, to compare an amount of the first recording data with the recording capacity, to request second recording target data of the external apparatus when lack of recording capacity is not estimated from a result of the comparison, to record, on the information storage medium, second recording data generated from the second recording target data, and to limit a request for the second recording target data when the lack of recording capacity is estimated from the result of the comparison, wherein the detection unit controls a light beam to trace a plurality of regions with different radial distances on the information storage medium, samples focusing error signals from the plurality of regions, generates a plurality of focusing control signals based on the plurality of focusing error signals, detects a plurality of DC bias components based on the focusing control signals, and detects a disc tilt amount of an optical axis with respect to each of the plurality of regions based on the difference between the DC bias components, and the determination unit determines the recording capacity of the information storage medium on the basis of the disc tilt amount.

6. An apparatus according to claim 5, wherein the detection unit detects a read rate of prepits recorded on the information storage medium, and the determination unit determines the recordable capacity of the information storage medium on the basis of the read state of the prepits.

7. An apparatus according to claim 5, wherein the detection unit detects a disc eccentricity amount unique to the information storage medium, and the determination unit determines the recordable capacity of the information storage medium on the basis of the disc eccentricity amount.

8. An apparatus according to claim 5, wherein the detection unit detects a read rate of wobble signals obtained in correspondence with wobbled tracks formed on the information storage medium, and the determination unit determines the recordable capacity of the information storage medium on the basis of the read rate of the wobble signals.

9. An apparatus according to claim 1, wherein:

the recording control unit generates the first recording data by adding a first error correction code to the first recording target data and modulating the first recording target data with the first error correction code, and measures an amount of the first recording data; and the recording control unit generates the second recording data by adding a second error correction code to the second recording target data and modulating the second recording target data with the second error correction code, and measures an amount of the second recording data.

10. An apparatus according to claim 5, wherein:

the recording control unit generates the first recording data by adding a first error correction code to the first recording target data and modulating the first recording target data with the first error correction code, and measures an amount of the first recording data; and the recording control unit generates the second recording data by adding a second error correction code to the second recording target data and modulating the second recording target data with the second error correction code, and measures an amount of the second recording data.

* * * * *